Figure 1:
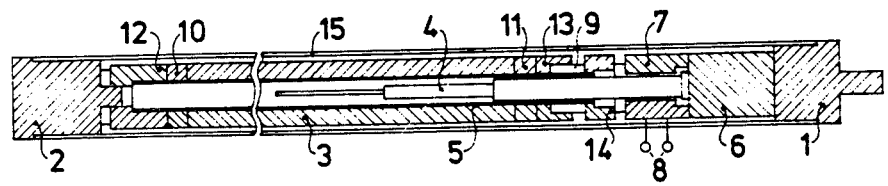

United States Patent [19]
Tasman et al.

[11] 4,195,523
[45] Apr. 1, 1980

[54] ULTRASONIC THERMOMETER

[75] Inventors: Herman A. Tasman, Karlsruhe; Ernst E. S. Pätzold, Stutensee-Friedrichstal, both of Fed. Rep. of Germany

[73] Assignee: European Atomic Energy Community (Euratom), Luxembourg

[21] Appl. No.: 926,614

[22] Filed: Jul. 21, 1978

[30] Foreign Application Priority Data

Aug. 5, 1977 [DE] Fed. Rep. of Germany ....... 2735908

[51] Int. Cl.² ............................................ G01K 11/24
[52] U.S. Cl. ................................................. 73/339 A
[58] Field of Search ..................................... 73/339 A

[56] References Cited
U.S. PATENT DOCUMENTS

| 3,580,076 | 5/1971 | Mosby | 73/339 A |
| 4,020,692 | 5/1977 | Arare | 73/339 A |

Primary Examiner—S. Clement Swisher
Attorney, Agent, or Firm—Stevens, Davis, Miller & Mosher

[57] ABSTRACT

An ultrasonic thermometer comprising a probe which is coupled to a magnetorestrictive transmitter and has discontinuities to reflect for each ultrasonic pulse applied to the probe a multiplicity of echoes of which the detection provides a measure of the ambient temperature of the probe. The probe is disposed in a tubular jacket. The probe and the jacket are separately anchored at respective ends, which may be proximate or remote, so that substantially all the probe moves relative to the jacket to rupture bridges or welds which may be formed between the probe and the jacket.

3 Claims, 3 Drawing Figures

ULTRASONIC THERMOMETER

BACKGROUND OF THE INVENTION

This invention relates to an ultrasonic thermometer comprising a tubular jacket tube surrounding a probe. Such a thermometer may be used for the measurement of high temperatures, for example above 2000° C., during long periods. A particular use of such a thermometer is the measurement of such temperatures in nuclear fuel rods.

COMMENTARY OF THE STATE OF THE ART

In ultrasonic thermometry an ultrasonic pulse is transmitted by an electromagnetic transmitter via a magnetostrictive transducer to a probe, (which constitutes a transmission line) and the difference in time between reflections from discontinuities in the probe is measured at the end. The ambient temperature to which this probe is exposed is ascertained from the signals' transit time on the line and knowledge of the speed of sound. The ultrasonic probe is protected from harmful influences by means of a tubular jacket. When the probe is used in a fuel rod the jacket is intended to prevent the deposition of fuel on the sensor wire.

In some applications of such ultrasonic thermometers, interference occurs at higher temperatures owing to diffusion welding between the probe and the jacket, or to the formation of deposits in the space between them. Bridges of material have an adverse effect on the propagation of the signal along the probe. The resulting interference distorts the result of the measurement to such a degree—depending upon the intensity of the effect—as to make any rational interpretation of the ultrasonic echoes impossible. Interference of this kind occurs particularly above 1800° C. with the materials which have been tried out for temperature measurement in fuel columns (thoriated tungsten, rhenium or tungsten-rhenium for the probe, and tungsten or tungsten-rhenium for the jacket).

Numerous experiments have already been carried out to prevent such welding or bridge formation between the probe and the jacket, or at least to delay it. In one such experiment, helical tungsten wires were inserted between the probe and the jacket. In another solution, the inside of the jacket tube is provided with a helically-extending projection in the form of a bead. The attempt has also been made to weld spacers on the probe, e.g. as described in publication EUR 5395, paper 35, page 701 by A. E. Arave and J. Buchenauer. All such attempts to prevent bridging or the penetration of deposits between the probe and the tubular jacket, by solutions making use of spacers of various kinds, have been unsuccessful, since the spacer-forming material additionally promoted welding. The experiment described by H. A. Tasman and H. E. Schmidt in "High-Temperature—High pressure" 1972, pp. 477–481, to overcome the above difficulties by coating the probe with thorium oxide, has had only slight success. The attempt to use a helically-coiled jacket has not given the required result either. Only complete absence of the jacket would appear to be promising to some extent, although at much lower temperatures in the range 1200° to 1400° C.

SUMMARY OF THE INVENTION

The object of the invention is to provide an ultrasonic thermometer which can be used without interference at temperatures of above 2000° C., particularly for measuring temperatures in nuclear fuel rods, even during long periods. A further object is to facilitate removal of bridging between the probe and the jacket without removing the fuel rod and, in particular without the necessity of interrupting the operation of the nuclear reactor. Nevertheless the invention is not limited to the attainment of these objects and has a more general utility.

The invention provides an ultrasonic thermometer comprising an ultrasonic transmission line, and a jacket for the line, in which the line and jacket are so disposed that thermal changes of dimension cause adjacent parts of the line and jacket to shift relatively to one another.

A particular advantage of the invention is the fact that material bridges forming between the probe and the jacket tube can be timely prevented if the system is regularly subjected to temperature changes. Since such temperature changes in many cases occur during normal operation of the monitored system, it may be expected that the invention will provide more durable ultrasonic thermometers without any further supervision. In those cases in which the monitored temperature varies only within narrow limits during operation of a system, it is in most cases possible to produce temperature changes regularly during operating intervals or the like, in order to obviate bridges or deposits between the probe and the jacket even when no rigid connection has formed. Even in systems in which sufficient temperature variations cannot be regularly produced as a precautionary measure, the application of the invention is of advantage since refurbishment of the probe is possible without removing the same, by temperature change or cyclic temperature fluctuations which occur during normal operation.

The coefficient of thermal expansion, the length dimensions and the fixing points of the jacket and of the measuring probe are preferably selected that the changes in length expected within the range of temperature variations occurring during operation are sufficient to prevent bridging between the measuring probe and jacket. The invention can be applied particularly to reactor engineering because the operating conditions applicable in such cases apply with enhanced importance particularly to measuring systems which will continue to operate without breakdown over relatively long periods, it being particularly important that repair is possible without removing the probe. Heretofore, if a thermometer was faulty, it had to be removed, and this could be carried out only during intervals between the reactor operation. Since the relative movements required between the probe and the jacket to break up bridges are produced solely by the temperature-dependent expansions and shrinkage of the material, no additional external drive mechanism is necessary to produce such movements.

Various embodiments of the invention are possible, their use being dependent upon the specific conditions in the case of the measured object. The important factor particularly is the possibility available for mechanically fixing the probe and jacket on the object whose temperature is to be measured.

BRIEF DESCRIPTION OF THE ACCOMPANYING DRAWINGS

Figure 2:
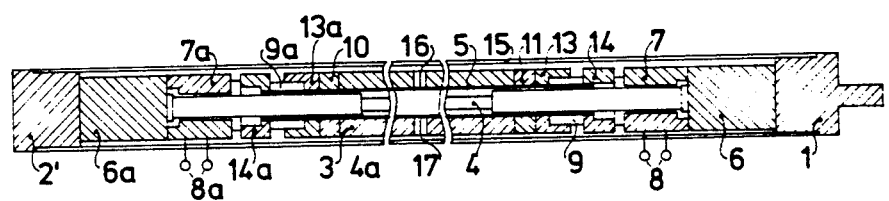
Figure 3:
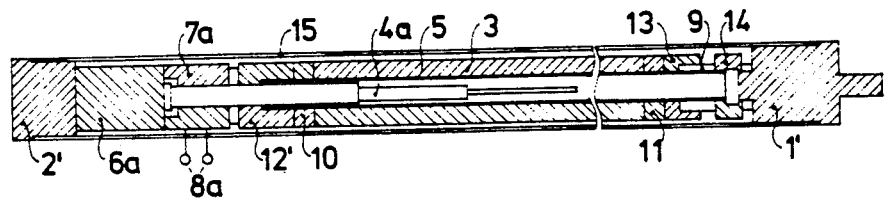

FIG. 1 is a section of a first embodiment of the invention, adapted for thermometric measurement in a fuel rod, in which the probe and jacket are mechanically fixed at distant locations;

FIG. 2 is a section of another embodiment of the invention in which two measuring probes are used, the measuring probe and jacket points which are fixed relatively to one another under longitudinal expansion due to temperature variations again being disposed at distances from one another; and FIG. 3 is a section of a third embodiment of the invention for use for temperature measurement in a fuel column in which the probe and the jacket have proximate anchorages and expand longitudinally—with different temperature coefficients—in the same direction.

In a first embodiment of the invention, shown diagrammatically in FIG. 1, an ultrasonic measuring probe is installed in a nuclear fuel rod. The spatial datums for the thermal changes of length of the measuring probe and the tubular jacket are at opposite ends so that the relative thermal movements occur in opposite directions.

The fuel rod illustrated comprises two terminal plugs 1 and 2, between which a cylindrical fuel element 3 and the thermometer are disposed. The thermometer comprises a probe 4, which constitutes the measuring sensor. It is surrounded by a tubular jacket 5, and is disposed substantially inside the fuel element 3. In order that ultrasonic signals may be generated in the probe 4, an element (not shown) of magnetostrictive material, which element is surrounded by a coil 7, is fixed on the probe in the usual manner near the fixed end of the probe. Between this end and the plug 1 is a permanent magnet 6 which (in accord with usual practice) provides a bias and increased sensitivity for the magnetorestrictive element.

Electrical pulses at an ultrasonic repetition frequency from a signal generator (not shown) are fed to the coil 7 via terminal connections 8. These electrical pulses induce a corresponding vibration in the magnetostrictive element; and this vibration is propagated along the probe in the form of an ultrasonic acoustic wave. The ultrasonic pulses are reflected from each discontinuity in the probe in the form of a step and from the far end of the probe 4 back to the coil 7. Voltage pulses are thus induced in the coil after a corresponding delay relative to the transmitted signal; these voltage pulses pass to an ultrasonic signal receiver (not shown) which is coupled to the terminal connections 8. The probe 4 has along its length several steplike reductions in section; each reflects the transmitted pulse so that a plurality of echoes can be successively received for each transmitted pulse owing to the different lengths of the paths from the magnetostrictive element to the discontinuities. Since the propagation speed of sound in solids is dependent upon temperature, the difference in time between the arrival of the different echoes, i.e. the transit time of the signals between the discontinuities, is a measurement of the temperature of the probe 4. It is, if desired, possible to calculate the different transit times for the different portions (between consecutive steps) of the probe and hence the temperatures in said portions.

The complete fuel rod is surrounded by a sleeve 15 which rigidly interconnects the plugs 1 and 2 and encloses the fuel element. The thermal expansion of the sleeve 15 is also included in the relative movements but will be disregarded here for the sake of simplicity.

Since ultrasonic measuring probes are used mainly for measuring high temperatures (above 2000° C.), the expansions occurring on heating are considerable. Since the fuel rod is rigidly clamped at the ends by means of the plugs 1 and 2, longitudinal expansion of the fuel element 3 is accommodated by a coil spring 9. That part of the fuel rod which contains the fuel element 3 is longitudinally defined by two insulating collars 10 and 11 which consist of the same material as the fuel, but have a lower concentration and are situated adjacent a bush 12 and a sleeve 13 respectively. The bush 12 accommodates one end of the jacket 5 and holds it fast at that end. The bush 12 is rigidly disposed relative to the plug 2. The other end of the jacket 5 fits into another bush 14; this end of the jacket can slide freely within the bush 14. The spring 9 bears at one end against the bush 14 and at the other end against the sleeve 13 and thus holds the fuel element in position despite changes in the element's length.

In this embodiment, the jacket 5 is anchored at its end connected to the plug 2 whilst the probe 4 is anchored at its end adjacent the plug 1. Accordingly, the thermal movements of the probe 4 and the jacket 5, due to differing coefficients of thermal expansion of the parts of the probe 4, jacket 5, and fuel rod, are always in opposition. Thus the relative movement between any part of the probe and the jacket is the sum of the components of movement of the adjacent regions of the probe and the jacket. The relative movement between the probe 4 and the jacket 5 rupture bridges formed by deposition of diffusion welding between the probe and the jacket. Such bridges impair the operation of the thermometer because they form spurious discontinuities in the acoustic transmission along the probe and thereby produce echoes which are superimposed on the true echoes, and can thus interfere with, the evaluation of those echoes. The effect of interference can be kept within limits because the bridges can be initially obviated. The causes of the interference can be obviated by controlled temperature changes as soon as such interference has been recognised in evaluation of the measurements. The forces produced by thermal expansion and contraction are large and so any bridges that are formed will be broken. The first embodiment of the invention shown in FIG. 1 has the advantage that the relative changes in length of opposite parts of the sensor wire 4 and of the jacket 5 can be kept substantially constant in the longitudinal direction of the fuel rod because the absolute amounts of the changes in length increase linearly in each case from the point of anchorage towards the free end.

The embodiment shown in FIG. 2 is generally similar to that of FIG. 1. However, the fuel rod contains a second, separate, ultrasonic thermometer, the probe of which projects into the jacket 5 from the end opposite the probe 4. For the sake of convenience those parts of the fuel rod which correspond in structure to those of the fuel rod in FIG. 1 have been given identical reference numbers which are suffixed "a" when they refer to the second thermometer. The plug 2' (on the left in the drawing) differs from the plug 2 in FIG. 1, because it must be adapted to the coil 7a required to control the second probe, and the (permanent) magnet 6a. The function of the second measuring probe is the same as that of the first.

The ends of the jacket 5 are freely movable in the bushes 14 and 14a. As in the embodiment of the invention shown in FIG. 1, when there are thermal changes of length, the movement of each individual part of a probe is in the opposite direction to that of an adjacent part of the jacket 5. In the arrangement shown in FIG.

2, the shear force applied to a bridge between the jacket and a probe is limited in one direction (cooling) by the force which is applied by the coil springs 9 and 9a to counteract the deflection of the middle part of the fuel element 3 (and of the jacket 5 rigidly connected thereto). If a greater force is required for rupture of bridges, the central zone of the jacket 5 adjacent the free ends of the probes 4 and 4a must be physically fixed—indicated by connections 16 and 17—so that the transmissible forces to that extent correspond approximately to half those in the embodiment shown in FIG. 1.

The attachment of the middle zone of the jacket 5 to the fuel rod and the anchorage of the ends of the probes will be obvious to those skilled in the art.

In the embodiment shown in FIG. 3, the probe and its jacket are anchored at the same end of the fuel rod, and so the thermal movements of adjacent parts of the probe and jacket are in the same direction. Relative displacement between such adjacent parts require the thermal coefficients of expansion of the materials of the probe and jacket to be different. The relative displacement has a maximum at the free end of the probe when the coefficients of expansion are different over the entire lengths of the probe and jacket. In this third embodiment, the fuel rod is provided with two plugs 1' and 2' which are fixed in position. The datums for the changes of length of the probe 4a and the jacket 5 are at the left-hand end of the fuel rod. The jacket 5 is held in a bush 12'. The probe 4a is rigidly connected to a magnet 6a and is encircled by a coil 7a associated with a magnetostrictive transducer hereinbefore described. The changes of length of the fuel element 3 are accommodated by the coil spring 9.

If, as stated previously, the coefficients of expansion of the probe 4a and the jacket are different bridges or welds at the free end of the probe are the most easily ruptured because the relative displacement of the probe and the jacket are greatest at that free end.

In deciding which embodiment should be selected for a particular task, the important factor is the construction of the monitored system in the region of the measuring station. Subject to the exigencies of circumstances, the properties of the different embodiments can be combined. The disposition of the anchorages and the lengths of the probe and jacket may be varied to suit the circumstances.

The relative displacements of the probe and the jacket may be ascertained by integrating and calculating the distance differences of the changes in lengths for the respective monitored location of the relative displacement, taking into account the relevant coefficients of thermal expansion, starting from the anchorages. The displacement between the probe and the jacket at any location depends on the position of that location. Since, for example, the datum of the probe in FIG. 3 is at the magnet 6a and the datum of the jacket is in the bush 12', the relative displacement at the location of the latter datum is greater than zero. The absolute value of the relative displacement at this location can be increased by lengthening that part of the probe 4a which is situated outside the jacket; thus any required relative displacement can (within wide limits) be selected.

The relative displacement ought normally to be selected in (for example) nuclear fuel rods such that any bridges of material between the probe and the jacket can be controllably cleared, at least when they are first formed, by temperature changes within the permissible range of operating temperatures.

When two probes are used, one might be disposed in accordance with the construction shown in FIG. 1 and the other may be disposed in accordance with the construction shown in FIG. 3. Such an embodiment consists of the right-hand part of FIG. 1 and the left-hand part of FIG. 3; obviously no separate illustration is necessary. In such an embodiment the parts corresponding to the coil spring 12a and the sleeve 13a are superfluous. The jacket may be anchored approximately in the middle of the fuel rod so that expansion of the fuel element may be accommodated by the spring 9. In such a construction, the shearing force in one direction (on cooling) is limited by the force of the coil spring. The relative movement in the other direction (on heating) is produced by the different expansion of the (substantially) half fuel element and the probe situated remote from the coil spring or that half of the element situated opposite the coil spring, and the difference between the expansion of the jacket and the probe situated adjacent the spring.

In practical experiments with fuel rods provided with ultrasonic thermometers made according to the invention interference occurring during temperature measurement in experiments covering a number of days were either completely eliminated or at least greatly reduced by brief temperature changes. In such cases, refurbishment of the probes by controlled thermal changes in length had to be restricted to reducing the interference causes if too long a time had elapsed since the bridges or welds had first occurred.

We claim:
1. An ultrasonic thermometer comprising:
   an ultrasonic transmission line for receiving ultrasonic mechanical wave signals from a source and reflecting echoes of said signals to a receiver comprising a probe having a first end fixed to a datum and a free end; a tubular jacket extending around said first end and along the length of the line, the jacket permitting sliding movement between said line and said jacket; and means providing fixed datums for said line and said jacket and for thereby enabling adjacent parts of said line and jacket to move relative to one another as said line and jacket experience changes in temperature, said means including means for clamping said jacket at a location remote from the fixed end of said probe whereby thermal expansions of said line and the jacket occur in opposite directions.

2. An ultrasonic thermometer according to claim 1, further comprising a second probe similar to the first-mentioned probe, the said probes extending into said tubular jacket at opposite ends thereof.

3. An ultrasonic thermometer according to claim 2, in which the said means providing fixed datums includes means for clamping said jacket at a location near the free ends of the probes.

* * * * *